United States Patent
Tanaka

(10) Patent No.: US 7,603,981 B2
(45) Date of Patent: Oct. 20, 2009

(54) IMPROPER FUEL MIXING DETERMINING APPARATUS FOR INTERNAL COMBUSTION ENGINE

(75) Inventor: Toshihiko Tanaka, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 12/166,843

(22) Filed: Jul. 2, 2008

(65) Prior Publication Data
US 2009/0031987 A1 Feb. 5, 2009

(30) Foreign Application Priority Data
Jul. 31, 2007 (JP) ............... 2007-198321

(51) Int. Cl.
*F02D 41/22* (2006.01)
(52) U.S. Cl. .................. 123/406.3; 123/690
(58) Field of Classification Search ........... 123/406.29, 123/406.3, 406.31, 690
See application file for complete search history.

(56) References Cited

U.S. PATENT DOCUMENTS

| | | | | |
|---|---|---|---|---|
| 5,172,655 A | * | 12/1992 | Forgacs | ............ 123/1 A |
| 5,195,497 A | * | 3/1993 | Yoshida et al. | ............ 123/696 |
| 5,515,280 A | * | 5/1996 | Suzuki | ............ 701/29 |
| 6,016,796 A | * | 1/2000 | Dalton | ............ 123/695 |
| 6,073,611 A | * | 6/2000 | Ohuchi et al. | ............ 123/435 |
| 6,474,308 B2 | * | 11/2002 | Okumura et al. | ............ 123/491 |

FOREIGN PATENT DOCUMENTS

JP 09-158819 6/1997

* cited by examiner

*Primary Examiner*—Erick Solis
(74) *Attorney, Agent, or Firm*—Nixon & Vanderhye P.C.

(57) ABSTRACT

If improper fuel (light oil or kerosene) is mixed into fuel (gasoline) supplied to the engine, a knock limit of an ignition timing is retarded. Based on such a characteristic, every when knocking is detected based on a detection signal from a knock sensor, the ignition timing is stored as the knock occurring ignition timing and the ignition timing is retarded by a predetermined amount. After repeating the above processes, it is determined whether the knock occurring ignition timing is retarded more than a determination value (for example, a retarded limit value of the knock occurring ignition timing in a case that proper gasoline is served). When the knock occurring ignition timing is retarded more than the determination value, it is determined that the improper fuel is mixed in the fuel.

4 Claims, 4 Drawing Sheets

IMPROPER FUEL MIXING DETERMINING APPARATUS FOR INTERNAL COMBUSTION ENGINE

CROSS-REFERENCE TO RELATED APPLICATION

This application is based on Japanese Patent Application No. 2007-198321 filed on Jul. 31, 2007, the disclosure of which is incorporated herein by reference.

FIELD OF THE INVENTION

The present invention relates to an improper fuel mixing determining apparatus for an internal combustion engine, which determines whether improper fuel is mixed in fuel supplied to the internal combustion engine.

BACKGROUND OF THE INVENTION

Fuel (gasoline) for a gasoline engine includes regular gasoline of which octane value is low and high-octane gasoline. As shown in JP-9-158819A, it is known that a control apparatus determines the octane value of fuel based on knocking intensity of the internal combustion engine and adjusts an ignition timing to a proper timing according to the determined octane value.

An internal combustion engine includes a gasoline engine which combusts gasoline, a diesel engine which combusts light oil, and the like. Recently, since a self serve gas station where a driver serves fuel by himself/herself is increasing, there is a possibility that the driver mistakenly serve light oil, which is improper fuel, to a gasoline engine. Besides, there is a possibility that low grade fuel may be served intentionally, which is a mixture of gasoline and improper fuel such as light oil or kerosene. Since regular gasoline and high-octane gasoline are same type fuel, even if regular gasoline is served to an engine for high-octane gasoline, the engine can be driven according to the technology shown in JP-9-158819A.

Even if improper fuel such as light oil or kerosene, or low grade fuel is served to a gasoline engine, some amount of gasoline remaining in a fuel tank is supplied to the engine with the improper grade fuel. Hence, in an electric engine control system, the engine can be driven by controlling the ignition timing if a mixing rate of the improper fuel is low. As the mixing rate of the improper fuel is increased, the combustion state of the engine is deteriorated, so that the engine rotation becomes unstable and a drivability is deteriorated. In the worst case, the engine may be stopped.

Besides, even if improper fuel or low grade fuel is served into the fuel tank where gasoline scarcely remains, the gasoline remaining in a fuel pipe is supplied to the engine at beginning, so that the engine can be driven properly for a while. After that, when the gasoline remaining in the fuel pipe is totally combusted and the improper fuel or the low grade fuel is injected into the engine, the combustion state of the engine is deteriorated so that the engine may be stopped in the worst case.

SUMMARY OF THE INVENTION

The present invention is made in view of the above matters, and it is an object of the present invention to provide an improper fuel mixing determining apparatus for an internal combustion engine which can detects a mixing of improper fuel when an improper fuel is mixed in the fuel supplied to the internal combustion engine.

In order to achieve the above object, according to the invention, an improper fuel mixing determining apparatus includes a knock detection means for detecting a knocking of the internal combustion engine, and an improper fuel mixing determination means for obtaining an ignition timing at which the knocking occurs (which is refer to as a knock occurring ignition timing, hereinafter) based on a detection result by the knock detecting means, and determining whether an improper fuel is mixed in a fuel supplied to the internal combustion engine.

If an improper fuel is mixed to the fuel supplied to an engine, a knock limit is varied to vary the knock occurring ignition timing. By monitoring the knock occurring ignition timing, it is accurately determined whether the improper fuel is mixed. When the improper fuel is mixed, the improper fuel mixing can be detected. Thereby, in a case that the improper fuel is mixed, a warning lump can notify a driver of the mixing of the improper fuel, so that the driver can promptly replace the improper fuel into the proper fuel. Besides, in a case that the improper fuel is mixed, an engine control is switched into an engine control for the improper fuel, so that the vehicle safely runs as long as possible.

In this case, when it is determined that the improper fuel is mixed, a mixing rate of the improper fuel may be estimated by an improper fuel mixing rate estimating means based on the knock occurring ignition timing. Since the knock limit is varied according to the mixing rate of improper fuel so that the knock occurring ignition timing is varied, the mixing rate of the improper fuel can be estimated based on the knock occurring ignition timing. Thereby, when the engine control is switched into the control for the improper fuel, an appropriate control according to the mixing rate of the improper fuel can be performed.

The present invention can be applied to a gasoline engine which combusts gasoline and it is determined whether light oil and/or kerosene as the improper fuel is mixed in gasoline. When light oil and/or kerosene are mixed in gasoline supplied to the gasoline engine, the mixing of the light oil and/or kerosene can be detected.

When light oil and/or kerosene are mixed in gasoline supplied to the gasoline engine, the knock limit of the ignition timing is retarded. Therefore, as a method for determining whether the improper fuel (light oil or kerosene) is mixed, for example, a retarded limit value of the knock occurring ignition timing is detected by repeating an execution of the process in which the ignition timing is retarded by a specified value every when the knocking is detected by the knock detecting means. It may be determined whether the improper fuel is mixed by comparing the retarded limit value of the knock occurring ignition timing with a specified determination value (for example, a retarded limit value of the knock occurring ignition timing in a case that proper gasoline is supplied to the engine).

According to the above determining method, however, in a case that the improper fuel (light oil or kerosene) is mixed to retard the knock limit, it cannot be determined whether the improper fuel is mixed before the ignition timing is retarded to a vicinity of the knock limit and the retarded limit value of the knock occurring ignition timing is detected.

The improper fuel mixing determination means repeats an execution of a process in which the ignition timing is retarded by a specified amount every when the knocking is detected by the knock detecting means, and determines that the improper fuel is mixed when the knock occurring ignition timing is retarded more than a specified determination value. According to this, in a case that the improper fuel (light oil or kerosene) is mixed to retard the knock limit, it can be determined whether the improper fuel is mixed at the time when the knock occurring ignition timing is retarded more than the specified determination value before the ignition timing is retarded to the vicinity of the retarded knock limit. Hence, the mixing of the improper fuel can be promptly detected.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

An embodiment of the present invention will be described hereinafter. In this embodiment, the present invention is applied to a gasoline engine which combusts gasoline as fuel.

Figure 1:
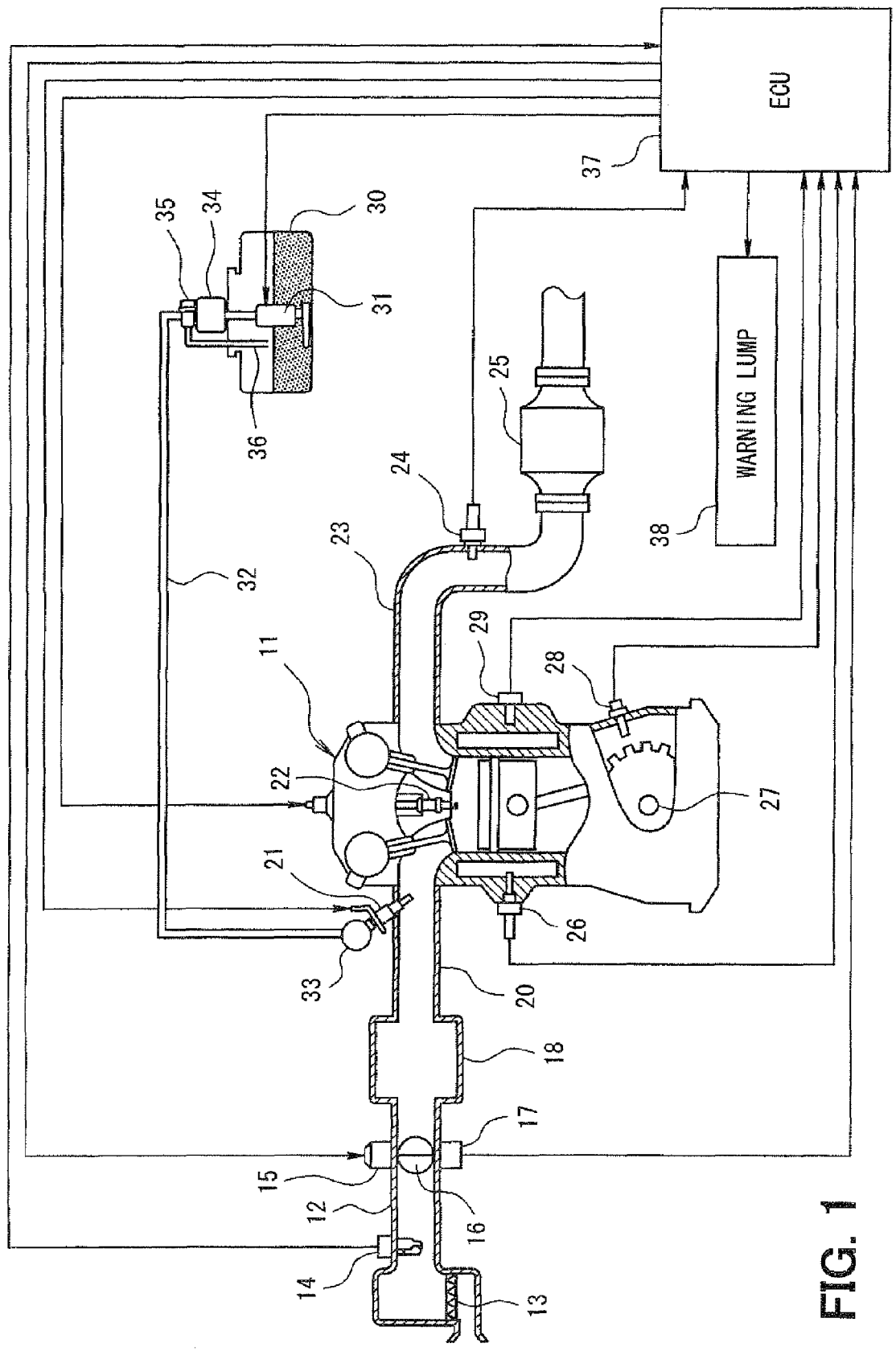
FIG. 1 is a schematic view showing an engine control system according to an embodiment of the present invention.

Referring to FIG. 1, an engine control system is explained. An air cleaner 13 is arranged upstream of an intake pipe 12 of an internal combustion engine 11. An airflow meter 14 detecting an intake air flow rate is provided downstream of the air cleaner 13. A throttle valve 16 driven by a motor 15 and a throttle position sensor 17 detecting a throttle position (throttle opening degree) are provided downstream of the air flow meter 14.

A surge tank 18 is provided downstream of the throttle valve 16. An intake air manifold 20 is connected to the surge tank 18 to introduce air into the engine 11. A fuel injector 21 is provided at a vicinity of an intake air port of the intake manifold of each cylinder to inject fuel into the cylinder. A spark plug 22 is mounted on a cylinder head of the engine 11 corresponding to each cylinder to ignite air-fuel mixture in each cylinder.

An exhaust gas sensor (an air fuel ratio sensor, an oxygen sensor) 24 which detects an air-fuel ratio of the exhaust gas is respectively provided in each exhaust pipe 23, and a three-way catalyst 25 which purifies the exhaust gas is provided downstream of the exhaust gas sensor 24.

A coolant temperature sensor 26 detecting a coolant temperature and a knock sensor 29 detecting knocking of the engine are disposed on a cylinder block of the engine 11. A crank angle sensor 28 is installed on a cylinder block to output crank angle pulses when a crank shaft 27 rotates a predetermined angle. Based on this crank angle pulses, a crank angle and an engine speed are detected.

A fuel pump 31 which pumps up fuel (gasoline) is provided in a fuel tank 30 which stores the fuel. The fuel discharged from the fuel pump 31 is sent to the delivery pipe 33 through the fuel pipe 32, and is distributed to the fuel injector 21 of each cylinder from this delivery pipe 33. A filter 34 and a pressure regulator 35 are connected to the fuel pipe 32 at a vicinity of the fuel pump 31. A discharge pressure of the fuel pump 31 is adjusted to a predetermined pressure by the pressure regulator 35. A surplus of the fuel exceeding the predetermined pressure is returned to the fuel tank 30 through a fuel-return pipe 36.

The outputs of the sensors are inputted to an electronic circuit (ECU, hereinafter) 37. The ECU 37 includes a microcomputer and a read only memory (ROM), and executes engine control programs to control a fuel injection quantity of the fuel injector 21 and an ignition timing of the spark plug 22 according to engine driving condition.

Even if improper fuel such as light oil or kerosene, or low grade fuel is served to a gasoline engine 11, some amount of gasoline remaining in a fuel tank 30 is supplied to the engine with the improper grade fuel. Hence, in an electric engine control system, the engine 11 can be driven by controlling the ignition timing if a mixing rate of the improper fuel is low. As the mixing rate of the improper fuel is increased, the combustion state of the engine is deteriorated, so that the engine rotation becomes unstable and a drivability is deteriorated. In the worst case, the engine 11 may be stopped.

Figure 3:
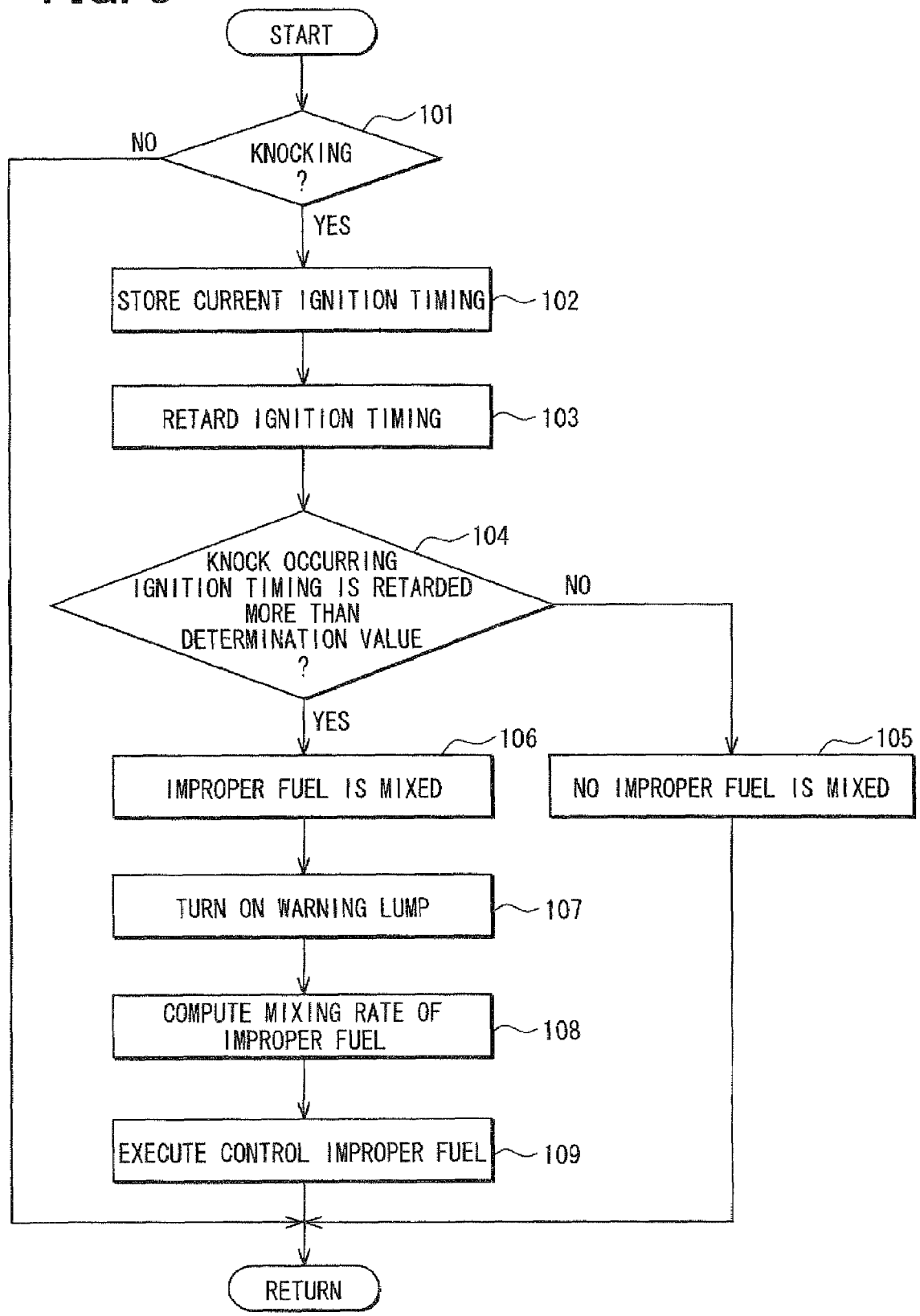
FIG. 3 is a flowchart showing a process of an improper fuel mixing determination routine.

The ECU 37 executes an improper fuel mixing determining routine shown in FIG. 3, whereby a knock occurring ignition timing (an ignition timing at which knocking occurs) is computed based on the detection signals from the knock sensor 29 and it is determined whether improper fuel (at least one of light fuel and kerosene) is mixed into the gasoline supplied to the engine 11 based on the knock occurring ignition timing.

Figure 2:
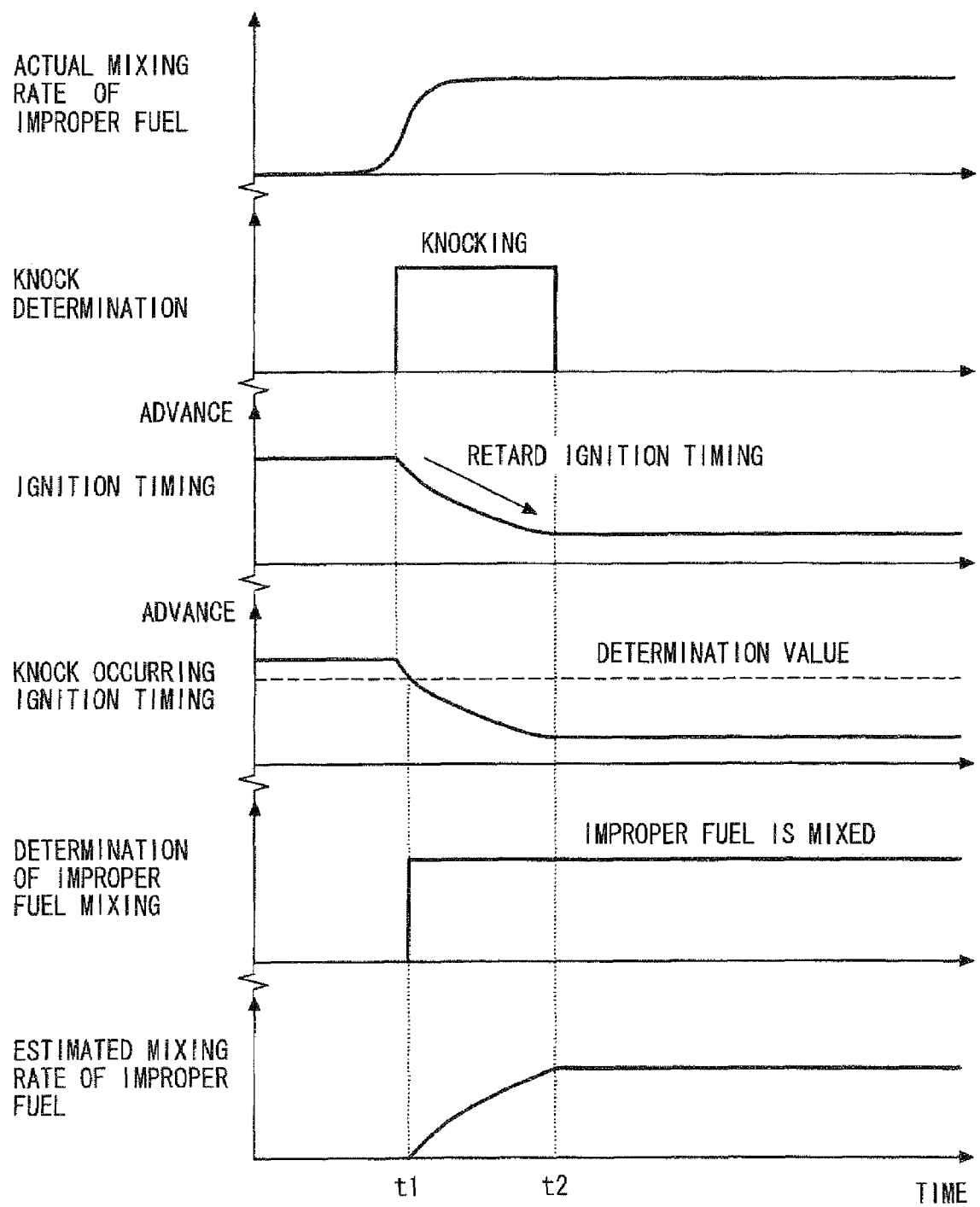
FIG. 2 is a time chart for explaining a determining method of improper fuel mixing.

Specifically, if light oil or kerosene is mixed into gasoline supplied to the engine 11, the knock limit of the ignition timing is retarded. As shown in a time chart of FIG. 2, every time when it is determined that knocking occurs based on the detection signal from the knock sensor 29, the ignition timing is stored as the knock occurring ignition timing and the ignition timing is retarded by a predetermined amount. After repeating the above processes, it is determined whether the knock occurring ignition timing is retarded more than a determination value, for example, a retarded limit value of the knock occurring ignition timing in a case that proper gasoline is served. At a time of t1 where the knock occurring ignition timing is retarded more than the determination value, it is determined that the improper fuel (light oil or kerosene) is mixed in the gasoline. Thereby, it can be accurately determined whether the improper fuel is mixed, so that the mixture of the improper fuel can be promptly detected if the improper fuel is mixed.

Furthermore, based on the characteristic where the knock limit is varied according to a mixing rate of the improper fuel to vary the knock occurring ignition timing, when it is determined that the improper fuel is mixed, the mixing rate of the improper fuel based on the knock occurring ignition timing is computed according to a map (refer to FIG. 4) or a formula so that the mixing rate of the improper fuel is estimated.

The improper fuel mixing determination described above is executed by the ECU 37 according to the improper fuel mixing determining routine shown in FIG. 3. The process of this routine will be described hereinafter.

The improper fuel mixing determination routine shown in FIG. 3 is executed at a specified time interval while the ECU 37 is energized. When this routine is started, in step 101, it is determined whether the knocking occurs based on the detection signal from the knock sensor 29. When it is determined that no knocking is occurring, the process of the routine is terminated without performing process in step 102 and following steps.

When it is determined that knocking is occurring in step 101, the procedure proceeds to step 102 in which the current ignition timing is stored as the knock occurring ignition timing. Then, the procedure proceeds to step 103 in which the ignition timing is retarded by the specified amount.

Then, the procedure proceeds to step 104 in which it is determined whether the knock occurring ignition timing is retarded more than the determination value. The determination value is set to, for example, a retarded limit value of the knock occurring ignition timing or a value which is more retarded (that is, a vicinity of the knock limit) in a case that the proper gasoline is served.

When it is determined that the knock occurring ignition timing does not exceed the determination value in step 104, the procedure proceeds to step 105 in which it is determined that no improper fuel such as light oil and kerosene is mixed so that the procedure of the routine is terminated. In this case, it is determined that knocking occurs due to factors other than the mixing of the improper fuel. According to the above process, every when knocking is detected, the ignition timing at this moment is stored as the knock occurring ignition timing and the processes (steps 101 to 104) in which it is determined whether the knock occurring ignition timing exceeds the determination value are repeated after the ignition timing is retarded by the specified amount.

Then, when it is determined in step 104 that the knock occurring ignition timing exceeds to the determination value in a retard direction at a time of t1 (refer to FIG. 2), the procedure proceeds to step 106 in which it is determined the improper fuel (light oil or kerosene) is mixed. Then, the procedure proceeds to step 107 in which an improper fuel mixing warning lump 38 provided on an instrument panel is turned on, or a warning indicator (not shown) provided on the instrument panel indicates "Mixing of improper fuel" to notify the driver of situation that the improper fuel is mixed. Thereby, the driver is notified of the mixing of the improper fuel promptly.

Figure 4:
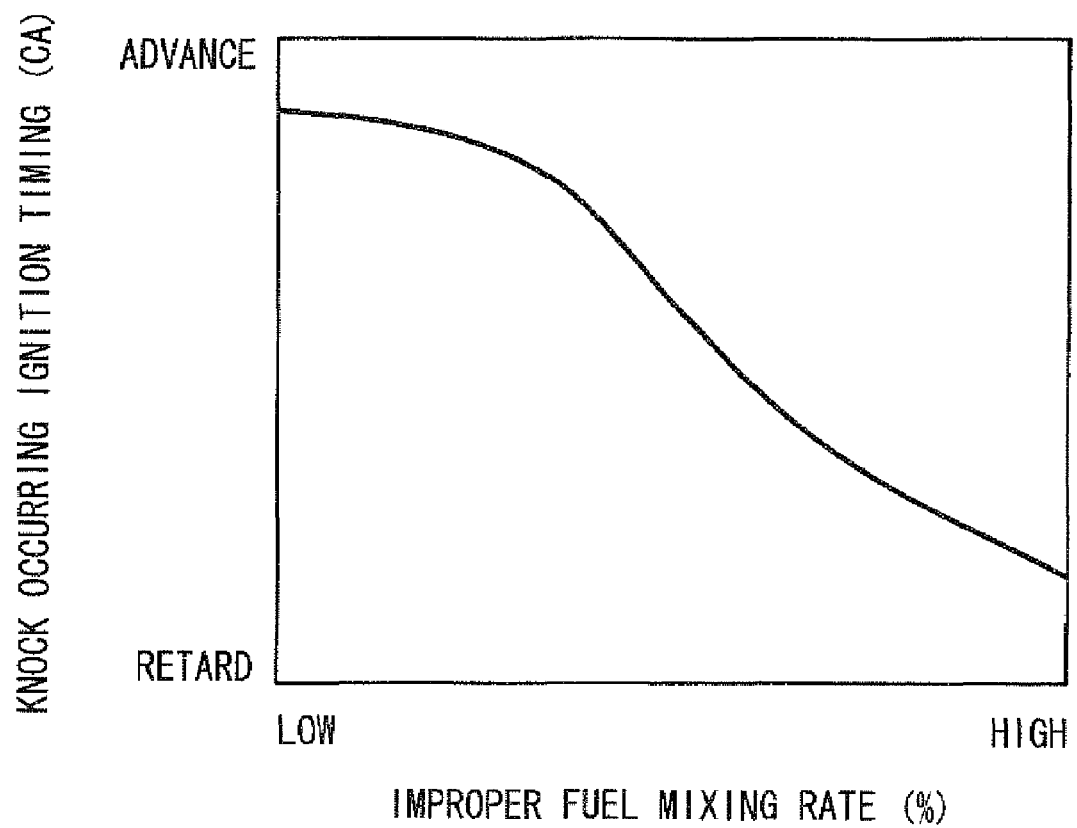
FIG. 4 is a chart showing a map of improper fuel mixing rate.

Then, the procedure proceeds to step 108 in which the mixing rate of the improper fuel is computed based on the current knock occurring ignition timing with reference to an improper fuel mixing rate map shown in FIG. 4. As the mixing rate of the improper fuel increases, the knock limit is varied in a retard direction to retard the knock occurring ignition timing. In the improper fuel mixing map shown in FIG. 4, as the knock occurring ignition timing is retarded, the mixing rate of the improper fuel increases.

Then, the procedure proceeds to step 109 in which a driving control (for example, at least one of fuel injection control, throttle control, torque control, air-fuel ratio control, and idle speed control) of the engine 11 is switched into a control for the improper fuel so that the vehicle safely runs as long as possible. The control for the improper fuel is executed based on the mixing rate of the fuel.

When it is determined in step 101 that the knocking does not occur at a time of t2 (refer to FIG. 2), it is determined that the ignition timing is retarded more than a retarded limit value of the knock occurring ignition timing corresponding to an actual mixing ratio of the improper fuel. The procedure of the routine is terminated.

The knock limit of the ignition timing is retarded if light oil or kerosene is mixed into gasoline supplied to the engine 11. Every when it is determined that knocking occurs based on the detection signal from the knock sensor 29, the ignition timing is stored as the knock occurring ignition timing and the ignition timing is retarded by the predetermined amount. After repeating the above processes, when the knock occurring ignition timing is retarded more than the determination value, it is determined that the improper fuel (light oil or kerosene) is mixed in the gasoline. Thereby, it can be accurately determined whether the improper fuel is mixed, so that the mixture of the improper fuel can be promptly detected if the improper fuel is mixed. When the improper fuel is mixed, the improper fuel mixing warning lump 38 notifies the driver of situation that the improper fuel is mixed. The driver can replace the fuel properly in a short time. Furthermore, when the improper fuel is mixed, the control of the engine 11 is switched to the control for the improper fuel, so that the vehicle safely runs as long as possible.

When the knock limit is retarded due to the mixing of the improper fuel (light oil or kerosene), it can be determined that the improper fuel is mixed at the time when the knock occurring ignition timing is retarded more than the determination value before the ignition timing is retarded to the vicinity of the retarded knock limit. The mixing of the improper fuel can be detected immediately.

Furthermore, according to the embodiment, based on the characteristic where the knock limit is varied according to a mixing rate of the improper fuel to vary the knock occurring ignition timing, when it is determined that the improper fuel is mixed, the mixing rate of the improper fuel is estimated based on the knock occurring ignition timing so that the mixing rate of the improper fuel is accurately estimated. Thereby, when the control of the engine 11 is switched into the control for the improper fuel, an appropriate control can be performed according to the mixing rate of the improper fuel.

Alternatively, it can be configured that the mixing rate of the improper fuel is not estimated when it is determined that the improper fuel is mixed.

The determining method of the improper fuel mixing can be modified in a proper manner. For example, every when knocking is detected based on the detected signal from the knock sensor 29, the ignition timing is retarded by a specified value. By repeating this process, the retarded limit value of the knock occurring ignition timing is detected.

According to the above embodiment, it is determined whether the improper fuel is mixed by comparing the knock occurring ignition timing with the determination value. Alternatively, it can be determined whether the improper fuel is mixed by comparing a variation amount in the knock occurring ignition timing with the determination value.

The present invention is not always applied to an inlet-port-injection engine shown in FIG. 1. The present invention can be applied to a direct injection engine, a dual injection having a fuel injector for inlet port injection and a fuel injector for direct injection.

Furthermore, the present invention can be applied to a diesel engine which combusts light oil as fuel. In this case, it is determined whether gasoline that is improper fuel is mixed in light oil supplied to the diesel engine.

Furthermore, the present invention can be applied to a bi-fuel engine which can combust any one of gasoline, alcohol, alcohol mixed fuel of gasoline and alcohol. Based on the knock occurring ignition timing, it is determined whether light oil or kerosene is mixed to the fuel supplied to the engine.

What is claimed is:

1. An improper fuel mixing determining apparatus for an internal combustion engine, comprising:
 a knock detection means for detecting a knocking of the internal combustion engine, and
 an improper fuel mixing determination means for obtaining a knock occurring ignition timing at which the knocking occurs based on a detection result by the knock detecting means, and determining whether an improper fuel is mixed in a fuel supplied to the internal combustion engine.

2. An improper fuel mixing determining apparatus for an internal combustion engine according to claim 1, further comprising an improper fuel mixing rate estimating means for estimating an mixing rate of the improper fuel based on the knock occurring ignition timing when the improper fuel mixing determination means determines that the improper fuel is mixed.

3. An improper fuel mixing determining apparatus for an internal combustion engine according to claim 1, wherein the internal combustion engine is a gasoline engine which combusts gasoline as the fuel, and the improper fuel mixing determination means determines whether light oil and/or kerosene is mixed as the improper fuel.

4. An improper fuel mixing determining apparatus for an internal combustion engine according to claim 3, wherein the improper fuel mixing determination means repeats an execution of a process in which the ignition timing is retarded by a specified amount every when the knocking is detected by the knock detecting means, and determines that the improper fuel is mixed when the knock occurring ignition timing is retarded more than a specified determination value.

* * * * *